April 24, 1956 H. T. SMITH 2,742,960
ROUND WORK THERMOCHEMICAL SCARFING APPARATUS
Original Filed May 1, 1948 2 Sheets-Sheet 2
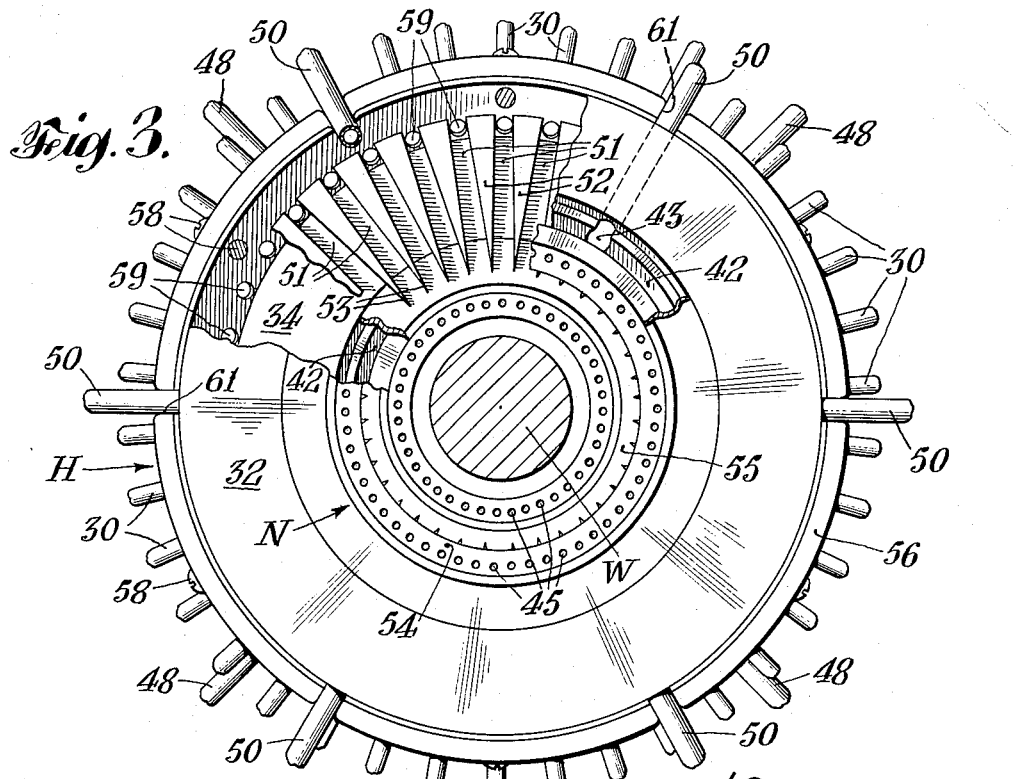
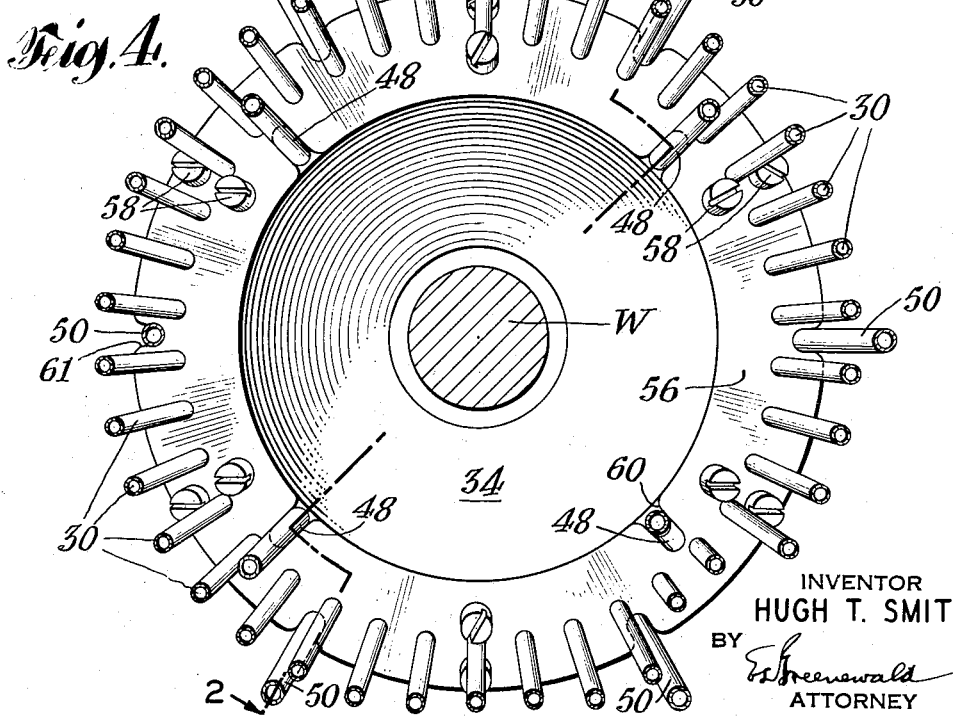
INVENTOR
HUGH T. SMITH
BY
ATTORNEY

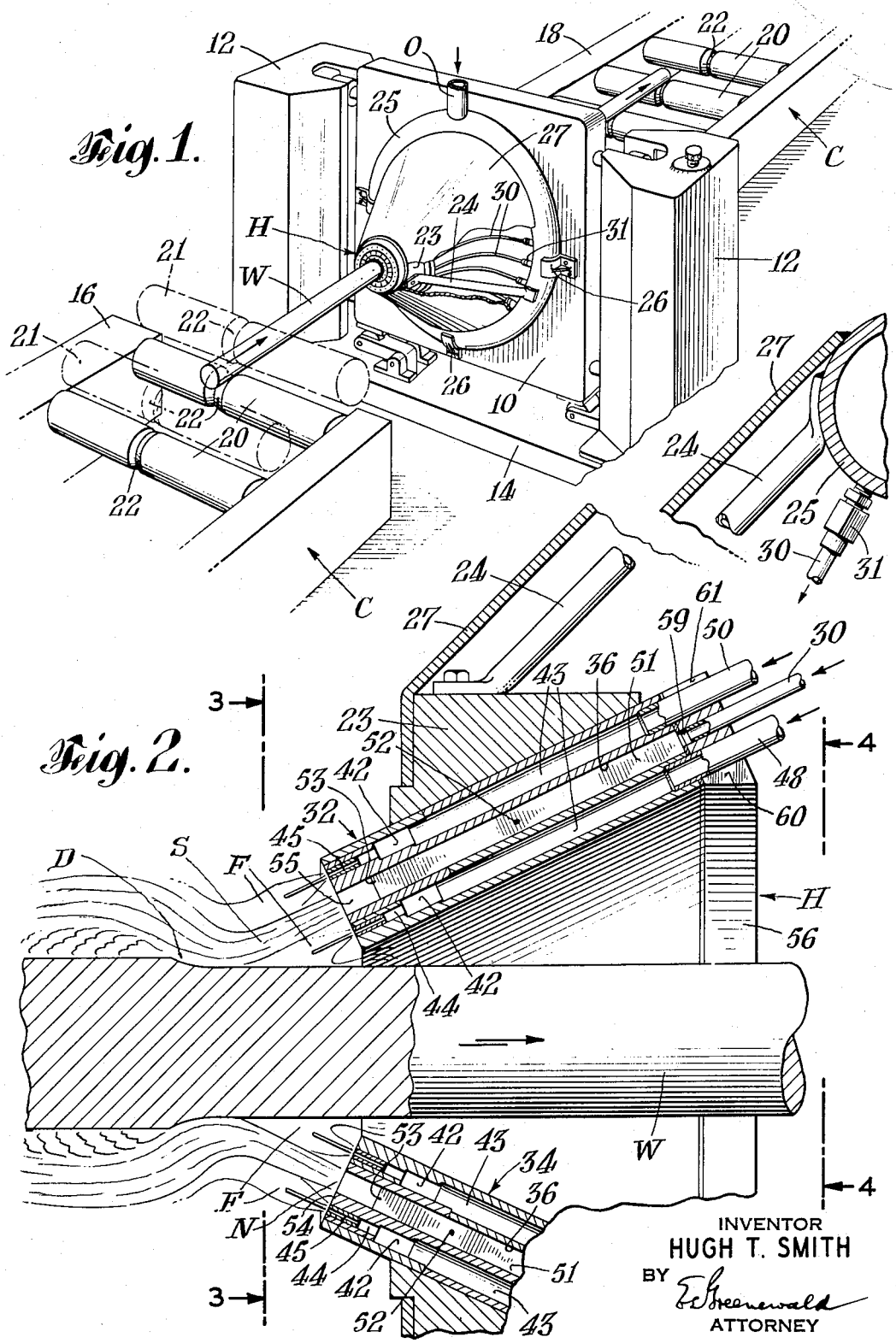

United States Patent Office 2,742,960
Patented Apr. 24, 1956

2,742,960

ROUND WORK THERMOCHEMICAL SCARFING APPARATUS

Hugh T. Smith, Chicago, Ill., assignor, by mesne assignments, to Union Carbide and Carbon Corporation, a corporation of New York Continuation of abandoned application Serial No. 24,584, May 1, 1948. This application June 1, 1950, Serial No. 165,397

2 Claims. (Cl. 158—27.4)

This invention relates to scarfing ferrous metal thermochemically with oxygen, and more particularly to scarfing the entire periphery of round work in a single longitudinal pass.

In recent years steel mills rolling rounds, especially for seamless tube production, have conditioned the rounds by costly mechanical peelers, because no thermochemical scarfing or desurfacing apparatus or method was available which could satisfactorily scarf round work, due to the physical and other difficulties which are involved. It has been proposed to scarf round work thermochemically by means of an annularly arranged series of nozzles disposed with their axes lying in a frusto-conical section, but this results in the formation of longitudinal grooves and ridges in the scarfed work, which is highly objectionable.

The main object of this invention is to provide a satisfactory process of thermochemically scarfing a continuous annular surface on either hot or cold rounds of ferrous metal with oxygen in a single longitudinal pass, so that the resulting surface is free of undesirable ridges and grooves. Another object is to provide improved apparatus for thermochemically scarfing round ferrous metal work with oxygen, which is efficient and effective in use, and simple and compact in construction.

The invention lies in the use of a cutting oxygen stream of novel shape, i. e. one which is annularly continuous and of uniform width, as well as in unique apparatus for producing a stream of such shape to obtain a smooth surfaced product. According to the invention there is provided a process of thermochemically scarfing round ferrous metal work in a single longitudinal pass, which comprises moving the work longitudinally of itself at a constant speed, discharging a frusto-conical hollow stream of cutting oxygen, which is annularly continuous and of uniform width, and has substantially uniformly distributed mass velocity, against each round as it moves longitudinally in opposition to the cutting oxygen flow, and at the same time applying against the work preheating flames arranged in circles around the outside and inside of the cutting oxygen stream, to maintain the reaction during the scarfing operation. The outer flame is produced by discharging a mixture of oxygen and fuel gas, but the inner flame is produced either by discharging commercially pure fuel gas, such as acetylene, or by discharging a mixture of oxygen and fuel gas.

Further, according to the invention there is provided a new thermochemical scarfing machine comprising a head having novel means for discharging an annularly continuous frusto-conical hollow stream of cutting oxygen against each round as it is moved through the head by a conveyor, and an annular burner for flame heating the round on both the outside and inside of such cutting oxygen stream to maintain the thermochemical reaction.

Referring to the drawings:

Fig. 1 is a fragmentary perspective view of a round bar scarfing machine illustrating the invention;

Fig. 2 is a fragmentary sectional view of the desurfacing head taken on line 2—2 of Fig. 4;

Fig. 3 is a view in front elevation of the desurfacing head looking in the direction of the arrows of line 3—3 of Fig. 2, the work being shown in section, and parts of the head being broken away; and Fig. 4 is a view in rear elevation of the head looking in the direction of the arrows of line 4—4 of Fig. 2, the work being shown in section.

The apparatus illustrated in the drawings includes a power driven work table or conveyor C adapted to move rounds W of ferrous metal at a substantially constant speed through a hollow thermochemical scarfing head H. The head H is mounted on a vertical panel 10 which is supported by uprights 12 for limited floating movement in a plane extending transversely of the longitudinal axis of movement of the work W by the conveyor C.

The uprights 12 are mounted on a transverse base 14 near opposite ends thereof. The base is located between front and rear sections 16 and 18 of the conveyor C which is provided with rolls 20 having annular grooves 22 for guiding the rounds W along the desired horizontal path through the scarfing head H. Any deviation in straightness of the work is taken care of by a compensating movement of the head H by virtue of the floating support of the panel 10.

The novel head H is mounted on the panel 10 by means of a collar 23, arms 24 and an annular metal conduit 25, the latter being secured to the panel by brackets 26. The head H is protected by a cone 27 of metal which is secured to the collar 23 and welded to the conduit 25. The conduit 25 also provides a gas distribution chamber for the cutting oxygen prior to its delivery to the head H through a battery of pipes 30 which are connected to the conduit 25 by an annular series of nipples 31 located on the inner side of the conduit. Cutting oxygen is supplied to the conduit 25 from a conventional source through an inlet O.

The head H is composed of two frusto-conical gas burners 32 and 34 which are nested together in spaced relationship to provide an inner conical cutting oxygen gas passage 36. The burners are provided with annular gas distribution passages 42 near the outlet ends of drilled preheating gas inlet passages 43. The passages 42 uniformly supply the gas, in turn, to an annular battery of holes 44 in which are fitted gas outlet orifice tips 45 through which the preheating gas is discharged in jets to produce work preheating flames F adjacent both the inside and outside of the cutting oxygen stream.

Suitable preheating flame gas is delivered to the inlets of the conical preheating gas passages through a number of inner and outer gas pipes 48 and 50, there preferably being four such pipes arranged in 90° relationship about the rear end of each inner and outer burner. The supply of gas to the inner and outer burners is preferably separated so that a mixture of oxygen and fuel gas can be supplied to the outer burner 32, while either commercially pure fuel gas alone, or a suitable mixture of combustible gas and combustion supporting gas, is supplied to the inner burner 34.

The conical cutting oxygen passage 36 is divided into a conically arranged series of ways 51 by inserts or wedges 52, the sharp ends 53 of which terminate in spaced relation upstream with respect to the end face 54 of the nozzle N, so that a continuous frusto-conical slot 55 of uniform width is provided for discharging the cutting oxygen. The inlet end of each cutting oxygen way communicates with one of the cutting oxygen supply pipes 30, the large end of the conical head H being provided with an annular closure plate 56 which is secured in place by screws 58. The plate is provided with suitable cutting oxygen inlet holes 59 in which the outlet ends of the pipes 30 are secured; and also with radial internal and external slots 60 and 61 for accommodating the inner and outer gas supply pipes 48 and 50, respectively.

It has been found desirable in some cases to have the cross sectional area of the ways slightly increasing from upstream toward the downstream ends. This could be accomplished in part or wholly by having the outer and inner conical walls of the oxygen passage recede from each other toward the downstream end, but it has been found that the efficiency of operation is good when the wedges 52 are so proportioned that the outer and inner conical walls of the oxygen passage have the same conic angle (the corresponding elements of the cones being parallel) while the cross sectional area of the ways between wedges increases slightly in the downstream direction.

The taper of each wedge is chosen so as to slightly overcompensate for the reduction of cross sectional area in the downstream direction due to the decreasing mean radius of the conical oxygen passage. It will be seen that the oxygen passage changes consecutively from a ring of tubular passages 30 to a conical group of ways 51 having slightly expanding cross sections and then to a common conical slot-like outlet portion 55 that has an annular cross section, the area of which decreases in the downstream direction.

According to the invention a conical oxygen stream is produced that not only provides high efficiency, but the desurfacing operation is stabilized so that minor amounts of eccentricity between the workpiece and the nozzle head do not cause "loss of cut" to occur, i. e., a failure of the cut to continue on one portion of the surface. Likewise, it has been found that the operation is so stabilized that lumps of scale and the like on the untreated surface of the work do not cause any loss of cut, and also substantial variations in the diameter of the work W can be tolerated by a given size of head H. One reason for this stability is believed to be due to the degree of mass velocity of the oxygen jet (i. e., of the order of 500–1000 feet per second) and the uniform annular distribution thereof.

The provision of an annular supply conduit 25 and an individual pipe 30 connecting the conduit 25 with the inlet of each way between wedges 52 contributes to the uniformity of distribution of the cutting oxygen among the several ways. The ratio of expansion of the cutting oxygen in the ways 51 is preferably about 2.5 to 1 between the inlet and outlet ends of each way.

While the stability of the conical desurfacing jet is such that a substantial variation in diameter of the work W can be efficiently desurfaced by a given size head H, the leading end of the round must be fairly accurately guided into the forward opening of the head H in order to avoid damage to the gas orifices. It is therefore preferable that suitable work alining means be also employed. One such means may be the use of pinch rolls, two being indicated in broken lines at 21, to cooperate with the conveyor rolls 20 for feeding the rounds in a straight path.

In operation, the cold (or hot) work or round W is first advanced by rollers 20 of the conveyor section 16 a short distance either in front of or into the hollow head H, and stopped. The preheating flames F from the annular burners 32 and 34 are applied to the round W about the periphery thereof until the metal reaches the ignition temperature in oxygen, whereupon cutting oxygen is supplied to the nozzle N, and the work is advanced at a constant rate by the conveyor C through the head H. A hollow conical stream S of cutting oxygen is thus applied against the work W as it moves longitudinally through the head H, so as to thermochemically scarf the same, the reaction being aided by the preheating flames F.

In a specific embodiment of the invention, apparatus as shown in the drawing was constructed to desurface round steel bars W nominally two inches in diameter. In such device the angle of the cone wall with the longitudinal axis of the cone was 25 degrees; although any angle between 20 degrees and 30 degrees can be used with good results.

It was found that this device required on the average, only about 4.5 cubic feet of oxygen to remove each pound of metal from two-inch cold-rounds. The best stability and results were obtained at work speeds of 50 to 60 feet per minute and cutting oxygen flows of 35,000 to 37,000 cubic feet per hour. At the work speed of 50 feet per minute and an oxygen flow of 35,600 cubic feet per hour, 0.261 inch on the diameter of the round was removed; at 60 feet per minute and 37,000 cubic feet per hour the depth of removal was 0.235 inch on the diameter. The velocity of the cutting oxygen stream ranged from below to slightly above the acoustic value, in the continuous slot 55 depending upon the speed of the work.

Tests were made on cold steel, and on hot steel at 600 degrees–800 degrees F. The results indicated that an increase in efficiency of approximately 8% was obtained at the elevated temperature.

Cuts were also made on 1⅞ inch and 1¾ inch diameter rounds, with the 2" diameter head H and it was found that as the diameter of the work decreased, the oxygen demand per pound of metal removed increased, i. e. to 5.85 cubic feet per pound of metal for 1⅞ inch, and to 6.75 cubic feet per pound of metal for 1¾ inch diameter work. For good efficiency, the maximum size variation that should be handled with any single nozzle is approximately ±⅛ inch.

Wedge shaped partitions 52 between each individual oxygen stream, extending to within ½ inch of the nozzle mouth, were used. This resulted in equal divergence of each stream in the partitioned portion, rather than convergence of the stream as would normally result from the conical shape of the nozzle. Tests were made both with the wedges in place, and with the wedges removed. It was found, however, that when the wedges were removed, the results were satisfactory especially when the diameter of the work exceeded two inches.

The conical burners are bolted together for separation and convenient cleaning. While both inner and outer preheating flames are necessary, the inner flames may be composed of burning jets of only commercially pure fuel gas, such as acetylene. This is an advantage, since flashback and backfire are avoided in the inner burner at least. The main advantage, however, is the almost ridgeless and grooveless result of the novel scarfing operation, which was not possible prior to the invention, involving work that is round.

This application is a continuation of my application Serial No. 24,584, now abandoned, filed May 1, 1948.

I claim:

1. In a thermochemical scarfing machine the combination with a hollow head shaped to accommodate work having a substantially cylindrical periphery and including an annular nozzle having a continuous frustoconical cutting oxygen discharge slot of uniform width converging toward the nozzle outlet and coaxial with the periphery of the work, of an annular conduit comprising an annular cutting oxygen distribution chamber having a cutting oxygen inlet, a collar fitting said nozzle, a metal cone secured at its large end to said conduit and supporting said collar at its small end, said chamber, collar, and cone all being coaxial with the substantially cylindrical periphery of the work, and passage means connecting said distribution chamber to said nozzle for delivering cutting oxygen from said chamber to said nozzle.

2. A continuous slot annular nozzle for the ridgeless thermochemical scarfing of the entire substantially cylindrical periphery of rounds of ferrous metal in a single longitudinal pass through the center of the nozzle, comprising the combination of two hollow frusto-conical members, one of which is nested inside of the other in spaced relationship, so that the space therebetween forms a frusto-conical passage for cutting oxygen, said frusto-conical members converging toward the outlet of the nozzle and coaxial with the substantially cylindrical periphery of the work, at least the outer one of which forms a preheat fuel gas burner, means including an annular closure fitting the large ends of said members for feeding cutting oxygen to the large end of said passage through an annular battery of cutting oxygen supply passages, and tapered wedges disposed in said passage for controlling the expansion of the cutting oxygen in flowing therethrough, the sharp ends of said wedges terminating in spaced relation upstream with respect to the narrow annular discharge end of said passage, so that a continuous annular slot of uniform width is provided in the nozzle from which the cutting oxygen is finally discharged.

References Cited in the file of this patent

UNITED STATES PATENTS

| | | | |
|---|---|---|---|
| 774,456 | Smith | | Nov. 8, 1904 |
| 2,058,388 | Rendleman | | Oct. 20, 1936 |
| 2,148,936 | Geibig | | Feb. 28, 1939 |
| 2,267,405 | Jones et al. | | Dec. 23, 1941 |
| 2,290,271 | Bucknam | | July 21, 1942 |
| 2,346,718 | Anderson | | Apr. 18, 1944 |
| 2,483,479 | Smith et al. | | Oct. 4, 1949 |

FOREIGN PATENTS

| | | | |
|---|---|---|---|
| 515,194 | Germany | | Dec. 24, 1930 |